United States Patent [19]

Woollenweber

[11] Patent Number: 4,776,168
[45] Date of Patent: Oct. 11, 1988

[54] VARIABLE GEOMETRY TURBOCHARGER TURBINE

[76] Inventor: William E. Woollenweber, 3169 Camino del Arco, La Costa, Calif. 92009-7856

[21] Appl. No.: 52,426

[22] Filed: May 21, 1987

[51] Int. Cl.[4] .............................................. F02B 37/12
[52] U.S. Cl. ...................................................... 60/602
[58] Field of Search ................ 60/600, 601, 602, 603; 415/151, 157, 158; 417/407

[56] References Cited

U.S. PATENT DOCUMENTS

| | | | |
|---|---|---|---|
| 2,874,642 | 2/1959 | Forrest | 415/157 UX |
| 3,557,549 | 1/1971 | Webster | 60/602 |
| 3,614,259 | 10/1971 | Neff | 60/602 X |
| 3,994,620 | 11/1976 | Spraker et al. | 415/157 X |
| 4,565,505 | 1/1986 | Woollenweber | 417/407 |
| 4,653,275 | 3/1987 | Sumser et al. | 60/602 |

FOREIGN PATENT DOCUMENTS 2633587 2/1978 Fed. Rep. of Germany ........ 60/602

Primary Examiner—Michael Koczo
Attorney, Agent, or Firm—Willian Brinks Olds Hofer Gilson & Lione

[57] ABSTRACT

A variable geometry turbine system for internal combustion engine turbochargers is provided which comprises a turbine wheel and a meridionally divided volute having first and second volute passageways defining first and second turbine inlet openings for the flow of exhaust gas from the passageways into the turbine wheel. The system further includes closure means movable betwen a first position in which both from both volute passageways to flow into the turbine turbine inlet openings are open to permit exhaust gas wheel to provide a mixed-flow turbine during periods of high engine speed; and a second position closing the first turbine inlet opening to permit exhaust gas from only the second volute passageway to flow into the turbine wheel to provide an axial-flow turbine during periods of reduced engine speed. The closure means of the system can further include valve means for diverting during periods of reduced engine speed. The turbine all exhaust gas flow into the second volute passageway system is simple in construction, durable, low in cost and provides efficient engine operation over a full range of engine speeds.

14 Claims, 4 Drawing Sheets

VARIABLE GEOMETRY TURBOCHARGER TURBINE

BACKGROUND OF THE INVENTION

The present invention relates generally to variable geometry turbines and, more particularly, to variable geometry turbines for internal combustion engine turbochargers, capable of operating efficiently over a broad range of engine speeds.

Turbochargers used on internal combustion engines can be designed to operate efficiently at a particular engine load and speed. Difficulties are encountered, however, when turbochargers are required to operate over a broad range of engine speeds, such as experienced with engines used in heavy-duty trucks. Turbochargers and other fixed geometry turbines operate at their maximum efficiency at the particular flow and pressure values for which they are designed. When they are operated at other than the conditions for which they are designed, however, losses are incurred which cause decreased efficiency in both the compressor component and the turbine component of the turbochargers.

If a turbocharger is designed to operate best on an internal combustion engine operating at high speeds (i.e. full throttle and high engine r.p.m.), the turbocharger will be considerably off its maximum efficiency point when the engine is "torqued down" to lower engine opeaating speeds. Conversely, if a turbo-charger is designed to operate most efficiently with the internal combustion engine operating in its low speed, torque peak operating range, the turbocharger will overspeed considerably when the engine is operated under full throttle, high engine speed conditions. Thus, turbocharger efficiency must be seriously compromised in applications such as truck engines which must operate both at high speeds on level freeway type roads and at torque peak operating speeds in pulling heavy loads over mountainous terrain.

To prevent overspeed in turbochargers which are matched to an engine at its low speed, torque peak operating range, a waste gate is frequently provided to bleed off exhaust gas to atmosphere ahead of the turbine to prevent the maximum speed of the turbocharger from exceeding safe limits when the engine is operated at high speed. The use of waste gates, however, allow energy to escape from the turbocharger system, resulting in a substantial loss in turbocharger efficiency.

The benefits obtainable with variable geometry systems are well known. Such benefits include lower engine fuel consumption, quicker acceleration of the turbocharger-engine combination in response to load and speed changes, less smoke in the engine exhaust during acceleration under load, and high torque at low engine speed while preventing turbocharger overspeed at a high engine speed and load.

Because of these benefits, there have been many attempts to design and develop variable geometry turbine components for turbochargers. Many such prior efforts involved employing variably positioned nozzle vanes in the turbine. In these prior systems the position of the nozzle vanes determined the nozzle area, and, the position of the nozzle vanes was varied as the engine load and speed changed in an attempt to match efficient turbocharger operating conditions with the engine operating conditions. These prior devices were complicated and expensive. They required rather small vane elements to be connected together in a manner which permitted them to change position precisely in conjunction with one another and with close clearances between their stationary and moving surfaces so that gas leakage was minimized. If any significant leakage occurred from one nozzle to another, the efficiency of the turbine suffered considerably. They were also required to function in the hottest portion of the exhaust gas flow path. Since the variable turbine components functioned in the hot engine exhaust gas environment, they are subject to distortion and cracking and subsequent failure.

In addition, the prior variable geometry turbine systems required a control system to position the variable components in specific locations dictated by the load and speed demands of the engine. The control system and the moving components contributed significantly to the cost of the engine-turbocharger combination. To date, the high cost of such variable geometry systems and the reliability problems of the complicated mechanisms that they employ have prevented a commercially successful variable geometry system from being developed.

SUMMARY OF THE INVENTION

The present invention provides a simple, reliable variable geometry turbine system, which can be particularly advantageous in internal combustion engine turbochargers. The invention provides a turbocharger with a variable geometry turbine which is durable and relatively low in cost, and which provides efficient turbocharger operation over a wide range of engine speeds.

In a preferred embodiment of the invention, the turbine system comprises a turbine wheel, which is rotatable about a central axis and which includes a central core and a plurality of outwardly extending vanes; a volute for engine exhaust gas surrounding the turbine wheel and a central divider wall defining first and second volute passageways and first and second turbine inlet openings, permitting engine exhaust gas flowing through the first and second volute passageways and from the first and second turbine inlet openings to act on the outwardly extending vanes of the turbine wheel; and closure means movable between a first position in which the first and second turbine inlet openings are open, permitting exhaust gas from both the first and second volute passageways to act on the vanes of said turbine wheel during periods of high engine speed, and a second position in which said first turbine inlet opening is closed, permitting exhaust gas from only the second volute passageway to act on the vanes of the turbine wheel during periods of reduced engine speed.

The invention can provide an internal combustion engine turbocharger with a turbine that operates efficiently, as an axial flow turbine, at low engine operating speeds and efficiently as a mixed flow turbine at high engine operating speeds. The invention permits the combination of a divided volute turbine casing with a turbine having a variable geometry turbine to provide a turbocharger which operates with substantially improved efficiency substantially over the entire operating range of an engine.

In an internal combustion engine turbocharger a divided volute turbine casing carries the pulsating flow of exhaust gas from one set of cylinders of the internal combustion engine in the first volute passageway and the pulsating flow of exhaust gas from another set of cylinders in the second volute passageway. The central divider wall of the volute maintains separation of the two pulsating flows to prevent the pulsating flow from one set of cylinders from deleteriously affecting the pulsating flow from the other set of cylinders. At high engine speeds both passageways in the divided volute are essentially full of flowing exhaust gas and direct their full flowing volume of gas into the turbine wheel. In the low speed, torque peak operating range of the engine however, the time interval between the pulsations of exhaust gas from the engine cylinders is longer, the passages are too large to efficiently match the reduced volume of the gas flow, and the available energy of the flowing exhaust gas is substantially reduced by its dissipation within the volute passageways.

In the preferred embodiment of the invention all of the exhaust gas from the internal combustion engine can be directed into one of the volute passageways at lower speeds, such as in the torque peak operating range, to compensate for the otherwise reduced volume flow of gas, to avoid the dissipation of the available energy of the flowing exhaust gas, and to maintain turbine operating efficiencies during such periods. In this aspect of the invention, the closure means can include, in addition, a member to close a turbine inlet opening, a valve means positioned upstream of the volute passageways to divert all engine exhaust gas from both branches of the engine manifold (i.e., all cylinders) into a single passageway of the volute turbine casing and from there through a single turbine inlet opening into the turbine wheel when the closure means closes the other turbine wheel opening. Thus, at low speeds, such as in the torque peak speed range, all engine exhaust gas flows into and is discharged into the turbine wheel from a single passageway and single turbine inlet opening to compensate for the reduced volume of gas flow.

In the invention, the turbine can comprise a mixed flow turbine in which exhaust gas from a first turbine inlet opening of a volute passageway can flow substantially radially into the turbine, and exhaust gas from a second turbine inlet opening of a second volute passageway can flow substantially axially into the turbine, and a closure member can move between positions in which the first turbine wheel opening from the first volute passageway is either open or closed. At high engine speeds both volute passageways can be open and a mixed flow turbine is provided with the advantages and efficiencies described in detail in U.S. Pat. No. 4,565,505. At lower engine speeds in the torque peak speed operating range, however, the first volute passageway can be closed by the closure member and the valve means can direct substantially all the exhaust gas into the second volute passageway from which it is directed axially into the turbine wheel. By properly designing the dimensions of the second volute passageway and the turbine wheel, turbine efficiency at lower engine speeds in the torque peak operating range, can be made to approach those of an axial flow turbine.

In such systems, the closure member and the valve means of the closure means are preferably linked together for simultaneous operation by a suitable control system responsive to boost pressure, engine speed and/or load changes.

In a further aspect of the invention, the closure means can be a cylindrical member which circumscribes, in part, the turbine wheel and which is moveable longitudinally along the axis of rotation of the turbine to close the turbine inlet opening of the volute passageway. In addition, the tips of the turbine blades can define an outside diameter of the turbine wheel which is slightly conical and the inside diameter of the closure member where it circumscribes the turbine wheel can also be slightly conical. In such embodiments, when the moveable cylindrical member is in its first open position, a larger than normal running clearance will exist between the outside diameter of the turbine wheel and the inside surface of the moveable cylinder. This can decrease turbine efficiency to a controlled extent providing an additional limitation on turbine speed when the engine is operating at high speeds.

In general, the present invention provides high turbine efficiencies at high engine speeds and at the lower speeds, e.g. in the torque peak operating range. The system is highly durable and less complex and costly than prior variable geometry devices.

Further features and advantages of the invention will become apparent hereinafter in conjunction with the following detailed description of preferred embodiments.

DETAILED DESCRIPTION OF THE PREFERRED EMBODIMENTS

Figure 1:
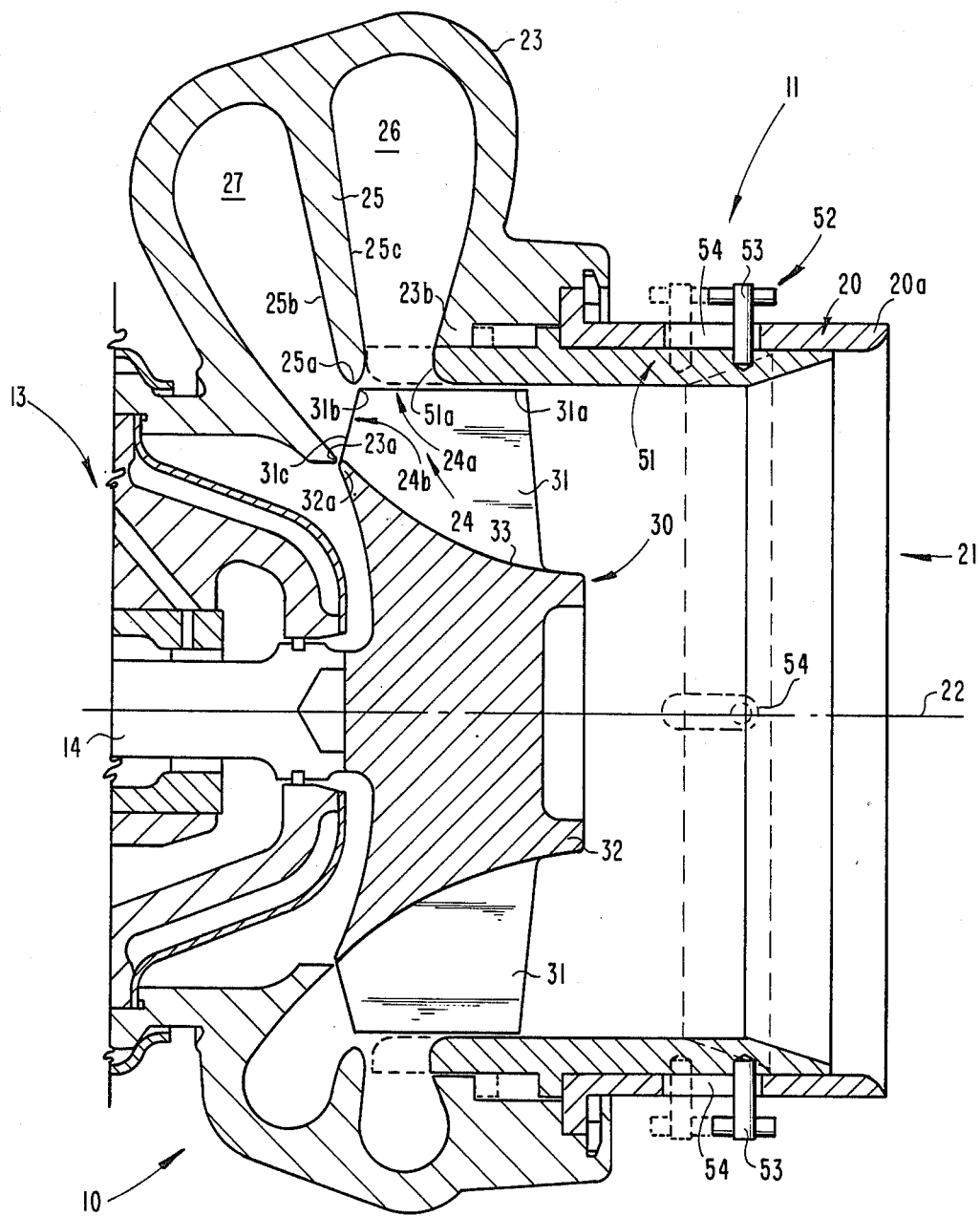
FIG. 1 is a cross-sectional view of a turbine portion of a turbocharger incorporating a variable geometry turbine according to a preferred embodiment of the invention.

FIG. 1 illustrates a portion of a turbocharger 10 including means 11 for defining a turbine at one end thereof. Turbocharger 10 also includes a compressor (not shown) at the other end thereof, and means 13 (partially illustrated) for supporting the rotating shaft 14 between the turbine and the compressor and its bearing system. A complete turbocharger is illustrated and described more fully in U.S. Pat. No. 4,565,505, and the compressor and shaft support means accordingly, are not described herein.

The means 11 for defining the turbine includes a turbine casing 20 with a volute portion 23 and a turbine wheel 30 having a plurality of turbine vanes 31 extending outwardly from a central core or hub 32. As shown in FIG. 1, the vanes 31 of the turbine wheel 30 have a maximum diameter that provides a small clearance between the tips 31a of turbine vanes 31 and the circumscribing portions of the turbine casing. Exhaust gas from the internal combustion engine is directed from the volute portion 23 of the turbine casing along its central axis 22, which is the axis of rotation of the rotating parts of the turbocharger 10. The exhaust gas acts upon the vanes 31 of the turbine wheel 30 causing it to rotate and drive the compressor portion of the turbocharger to force air into the cylinders of the internal combustion engine to increase the power output of the engine.

Figure 2:
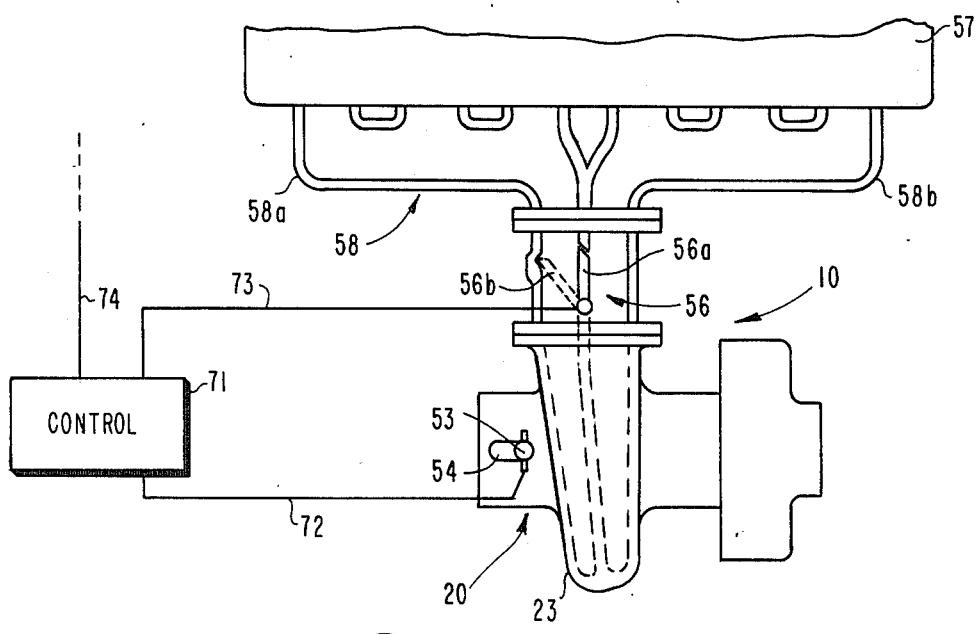
FIG. 2 schematically illustrates a system including a turbocharger with the variable geometry turbine of of FIG. 1, connected with means for controlling the flow of exhaust gas from an internal combustion engine to the variable geometry turbine of the turbocharger.

Turbine casing 20 forms a volute portion 23 (shown in cross-section in FIGS. 1, 3 and 4) that extends around the periphery of the turbine wheel 30 and forms the turbine inlet opening 24. Volute portion 23 of turbine casing 20 includes a meridional or central divider 25 forming first and second volute passageways 26 and 27 that extend around the periphery of the turbine wheel and deliver exhaust gas from an internal combustion engine 57 (see FIG. 2) into the turbine 30 through turbine inlet opening 24. As shown in FIG. 2, the volute portion 23 is connected to the internal combustion engine at its manifold 58, so that exhaust gas from one set of cylinders is directed through exhaust manifold portion 58a to volute passageway 26 and exhaust gas from the other set of cylinders is directed through exhaust manifold portion 58b to volute passageway 27. Central divider 25 divides turbine inlet opening 24 into first and second turbine inlet openings 24a and 24b through which exhaust gas from the first and second volute passageways 26 and 27, respectively, are directed into turbine 30.

Turbine inlet opening 24 is defined by turbine casing portion 23a at the rear of the turbine and casing portion 23b defining the forwardmost edge of the turbine inlet opening. As shown in FIG. 1, the turbine casing portion 23 forming the volute leading to the turbine 30 lies in substantial part rearwardly of a plane through the rearwardmost portion 32a of the turbine wheel that is perpendicular to its axis of rotation 22. In the centrally divided turbine casing, volute passageway 27 and the central divider 25 lie substantially entirely rearwardly of the plane in which the rearwardmost point 32a of turbine 30 rotates. Volute passageway 26 lies substantially rearwardly of the forwardmost point 23b of turbine inlet opening 24.

The outer surface 33 of central core 32 of turbine 30 is formed in such a manner that lines lying generally in a direction parallel to its axis of rotation 22 and tangent to surface 33 over substantially the entire axial extent of outer surface 33 extend at acute included angles, generally less than about 50°, with respect to its axis of rotation 22. The included angle of such a line extending generally parallel to the axis of rotation 22 and tangent to surface 33 adjacent the turbine rearmost point 32a is about 45°, and the included angles of such lines decreases substantially as the point of tangency of such lines moves in the direction of the turbine exhaust outlet 21. In the preferred embodiments shown, the included angle of surface 33 with respect to its axis of rotation decreases to about 9°–10° at the end adjacent the exhaust outlet 21.

In the embodiment shown, tips 31b of the turbine vanes 31 lie closely adjacent the innermost termination 25a of the central divider 25 of volute portion 23.

The exhaust gas from volute passageway 27 is directed generally axially with respect to the turbine wheel 30. The rearwardmost inside surface 23a of volute portion 23 of casing 20 forming the turbine inlet 24 will direct exhaust gas leaving the volute passageway 27 at the rearfacing surfaces 31c of the turbine vanes in a direction generally parallel to (i.e., tangent to) the outer surface 33 of central core 32 of the turbine wheel at its rearward end (i.e., adjacent portion 32a). The inside surface 25b of central divider 25 forming volute passageway 27 lies at acute included angles with respect to both the outer surface 33 of central core 32 and to its axis of rotation and will direct exhaust gas from passageway 27 at acute included angles with respect to both the outer surface 33 of the central core and to the axis of rotation 22.

The exhaust gas from volute passageway 26 is directed generally radially with respect to the turbine wheel. The surface 25c of central divider 25 forming volute passageway 26 generally directs exhaust gas from volute passageway 26 at an acute included angle with respect to the outer surface 33 of central core 32 of the turbine and generally toward exhaust opening 21. Substantially all of the exhaust gas leaving volute portion 27 and some of the exhaust gas leaving volute portion 26 is directed at an acute included angle with respect to the axis of rotation of the turbine and generally toward exhaust opening 21 of the turbine; and thus the volute portion 23 of turbine casing 20 may be considered to be canted rearwardly of the turbine.

The features of turbocharger 10 embodied in the turbine forming means 11 provide a mixed-flow turbine, that is, a turbine having both axial and radial flow, and provide a reduction in energy lost due to deflection of the exhaust gases. Since the outer ends 31a of the turbine blades 31 and the central dividing wall 25 of the volute portion 23 of the turbine casing have a very small clearance (i.e., the outer ends 31b of the turbine vanes extend closely adjacent to the termination 25a of the central dividing wall 25 of the volute portion of the turbine casing), interaction of gases between the divided passageways 26 and 27 is substantially reduced.

The divided volute directs gas into the turbine wheel alternately from passages 26 and 27 in accordance with the pulsations coming from portions 58a and 58b of the divided engine exhaust manifold 58 (FIG. 2) At high engine speeds the flowing exhaust gases from both manifold portions 58a and 58b (both sets of engine cylinders) essentially fill volute passageways 26 and 27 and the turbine operates with great 1 by virtue of its axial flow, the reduction of mixing and loss at the turbine inlet opening, and the reduction of energy lost due to deflection of the exhaust gases. At lower engine speeds, such as in torque peak operating range, however, the time interval between pulsations of gas flow from the engine cylinders is longer, and the passages 26 and 27 are too large in area to efficiently match the reduced volume of gas flow. The energies of the pulsating exhaust gases are dissipated in the volute passageways 26 and 27 and are unavailable to drive the turbine wheel. If an effort is made to compensate for this problem by designing the volute portion and turbine wheel to operate efficiently at lower engine speeds, such as those in the torque peak operating range of the engine, the turbine will drive the turbocharger at damagingly high speeds when the engine is operating at high speeds.

To provide high turbine operating efficiencies over a wide range of internal combustion engine operating speed, such as high speed operation on level terrain and low speed, high torque output operation on mountainous terrain, the invention incorporates into the turbine a variable geometry component comprising a closure means 51 which is moveable between a first position, shown in solid line in FIG. 1, in which turbine inlet opening 24 is fully open to permit gas flow into the turbine wheel from both volute passageways 26 and 27 and to a second position, shown in dotted line in FIG. 1, in which turbine inlet opening 24a is blocked to prevent gas flow from first volute passageway 26 into the turbine wheel.

Figure 3:
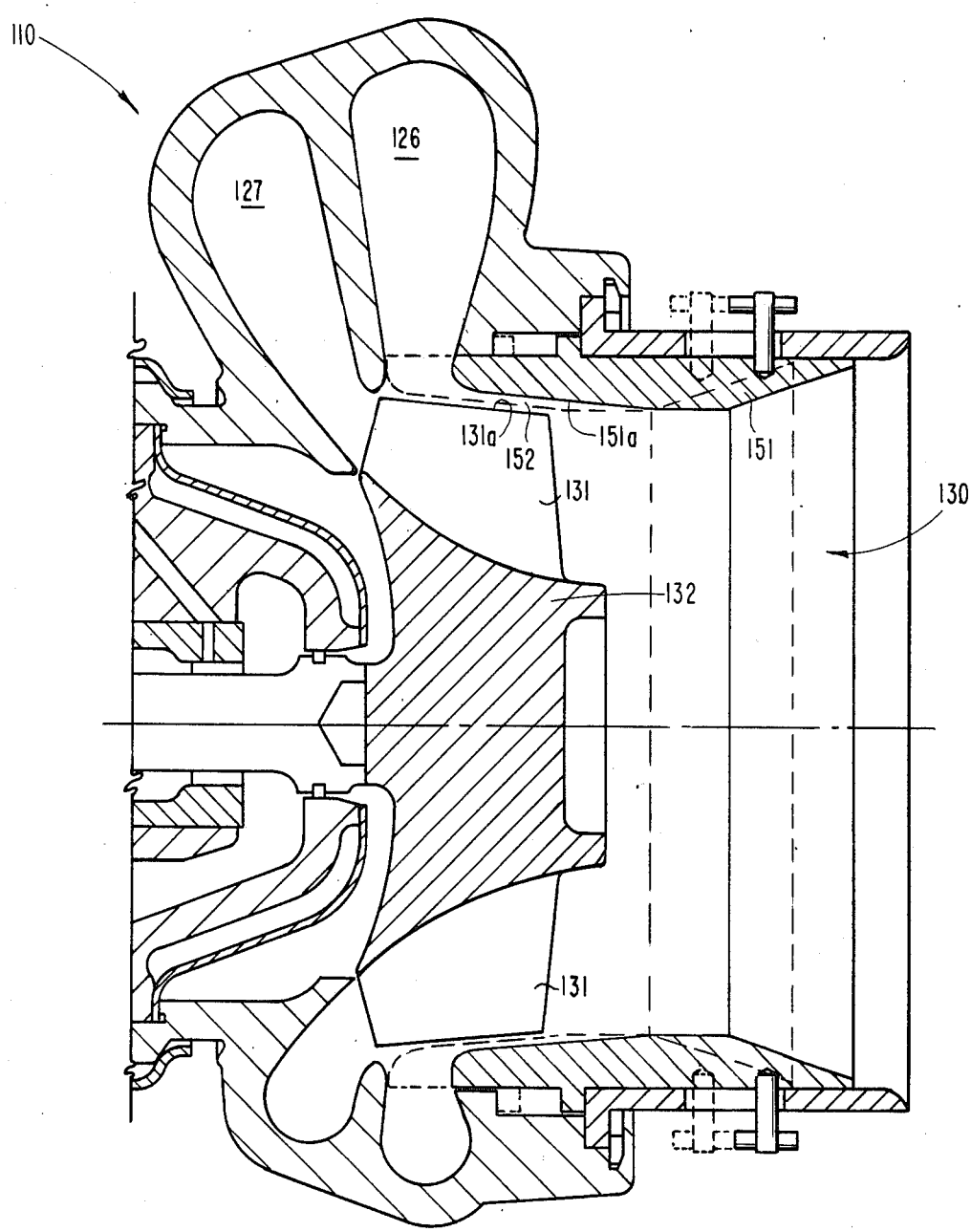
FIG. 3 is a cross-sectional view of a turbine portion of a turbocharger incorporating a variable geometry turbine according to an alternative embodiment of the invention.
Figure 4:
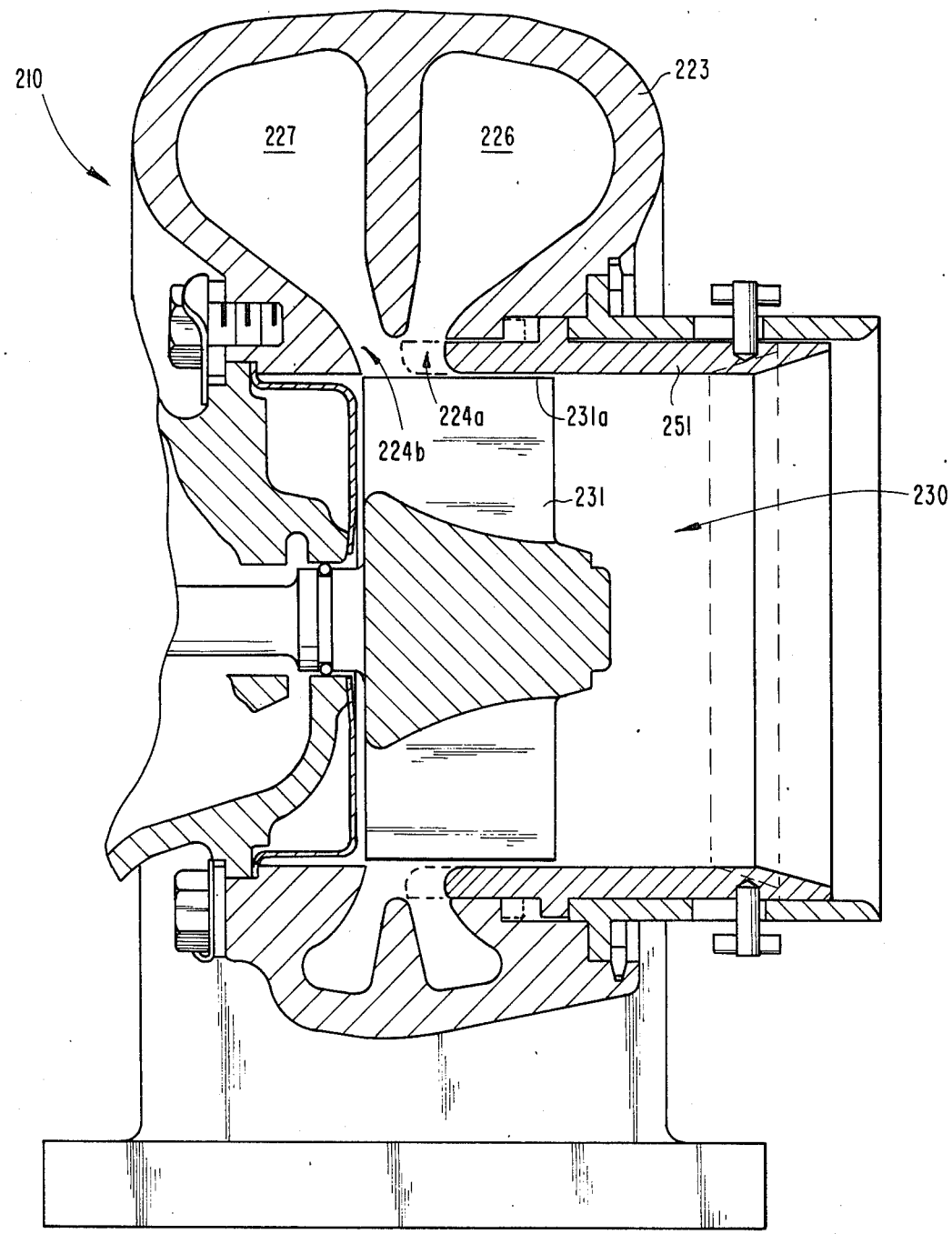
FIG. 4 is a cross-sectional view of a turbine portion of a turbocharger incorporating a variable geometry turbine according to another alternative embodiment of the invention.

In the embodiments of FIGS. 1, 3 and 4, closure means 51 comprises a cylindrical-shaped closure member positioned within exhaust outlet portion 20a of turbine casing 20. Cylindrical closure member 51 is supported within turbine casing portion 20a by a plurality of pins 53 which extend through longitudinal slots 54 in casing portion 20a, and which are incorporated within a sliding mechanism generally designated by reference numeral 52.

At high engine speeds, closure member 51 is in the position shown in solid line in FIG. 1, and both passageways 26 and 27 are open and all of the exhaust gas of the engine is directed through two openings 24a and 24b into the turbine wheel 31 and turbine vanes 31a. At lower engine speeds closure member 51 is in the position shown in dotted line in FIG. 1 to close turbine inlet opening 24a and block passageway 26.

Simultaneously with the movement of closure member 51 to block volute passageway 26, all of the engine exhaust gas from manifold 58 can be diverted into passageway 27 if, as shown in FIG. 2, another closure means, such as valve means 56 is positioned upstream of the volute portion 23 of turbine casing between volute portion 23 and engine manifold 58. Valve means 56 is moveable between a first position 56a, shown in solid line, in which volute passageways 26 and 27 are both open to the engine exhaust gas from, respectively, manifold portions 58a and 58b and a second position 56b, shown in dotted line, in which passageway 26 is closed and exhaust gas from engine manifold portion 58a is diverted into passageway 27, which also carries the exhaust gas from manifold portion 58b. Thus, in torque peak operating range, for example, all the exhaust gas from both branches of the engine manifold 58 (i.e. from all cylinders of the engine) can be directed into volute passageway 27 of the turbine casing and generally axially into the turbine wheel 30 through turbine inlet opening portion 24b. The dimensions of passageway 27 and the back face 31c of turbine wheel 30 can be designed to match the volume of gas flowing at torque peak operating speeds, and, thus, turbine efficiency remains high, approaching that of an efficient axial flow turbine.

When the engine moves into its high speed range, sliding mechanism 52 retracts closure member 51 back to its first solid line position in FIG. 1 where its end surface 51a is adjacent to the turbine casing wall 23b and volute passageway 26 is open. Simultaneously, valve means 56 is returned to its solid line position 56a, allowing the divided manifold system 58 to deliver exhaust gas from the engine cylinders into the divided turbine casing passageways 26 and 27. Thus, such a closure means, including closure member 51 and valve means 56, is operable to direct the plurality of flows of exhaust gas from the engine cylinders at the rear of the turbine vanes for axial flow through the turbine wheel.

Thus, with the present invention a combination axial flow and mixed-flow turbine system can be provided wherein at high engine operating speeds, the turbine comprises a mixed-flow turbine, and at low operating engine speeds, the turbine comprises essentially an axial flow turbine. The turbine system includes variable geometry components comprising a closure member moveable between first and second positions to switch the turbine from its mixed flow mode to its axial flow mode, and a valve mechanism to control simultaneously the flow of gases from the engine manifold to the divided volute of the turbine casing. The variable geometry mechanism is relatively simple in design and durable, and maintains high turbine efficiency throughout a wide range of engine operating speeds with significant benefits in engine performance and fuel consumption. Turbochargers of the invention can be designed to operate at maximum efficiency with the engine running at high speeds and at maximum speeds which are not damaging to the turbocharger. Turbochargers incorporating this invention can be designed to optimize engine operating conditions at both maximum rated engine speed and maximum rated engine torque output.

Closure means, including closure means 51 and valve means 56, can be operated by a system control 71 by lines 72 and 73, respectively (FIG. 2). The system control 71 can be, for example, an air operated actuator which is triggered by an electronic control which senses either engine speed or engine boost pressure or both, and can operate the closure means 51 and valve means 56 to maintain turbocharger operating efficiency according to a preselected program. In a sense, the control system 71 makes the turbocharger "shift gears" to provide high boost at low engine speeds and to accelerate the turbine to high speeds during engine transients. The control system 71 can take many forms and operate the turbocharger system by many programs based upon the sensed operating conditions of the internal combustion engine to which the turbocharger is attached. The control system 71 can include a number of adjustable controls permitting its operating program to be adjusted or changed or fitted to various internal combustion engines.

FIG. 3 illustrates a turbocharger 110 according to an alternative embodiment of the invention for providing improved control over the speed of the turbocharger. In the FIG. 3 embodiment the outside tips 131a of the turbine vanes 131 are tapered to give the outside diameter of the turbine wheel a generally conical shape. The closure means is a moveable cylinder 151 with its inside surface provided with a somewhat conical surface portion 151a.

In the embodiment of FIG. 3 when the moveable cylinder 151 is in its first open position indicated in solid lines in FIG. 3., a larger than normal clearance 152 exists between the outside of the turbine wheel vanes 131a and the inside surface of cylinder 151. Since the tapered vane tips 13 and the conical inside surface 151a define a significant clearance 152, the exhaust gas from volute passageways 126 and 127 will leak through clearance 152, and the energy of the leaking portion of the exhaust gas will not be imparted to the turbine wheel 132. Although the clearance 152 decreases turbine efficiency to a controlled extent, it can provide an additional limitation on the maximum speed of the turbocharger when the engine is operating at high speeds.

When cylinder 151 is in the position indicated in dotted line in FIG. 3, the clearance between the tips of the turbine wheel vanes 131a and the surface 151a of the closure means 151 returns to normal small clearance thus creating a condition of high axial turbine efficiency and providing the high engine boost necessary to produce high torque at low engine speeds. The embodiment of FIG. 3 is preferably combined into a system like that shown in FIG. 2 to direct substantially all of the engine exhaust gas through volute passageway 127 and axially through the turbine wheel 132 when closure means 151 blocks volute passageway 126.

FIG. 4 illustrates a further embodiment of the invention. FIG. 4 illustrates a turbocharger 210 having a conventional radial turbine 230 rather than a mixed flow turbine as in the embodiments of FIG. 1 and FIG. 3. Radial turbine 230 is provided with tips 231a of the turbine vanes 231 providing the turbine with a cylindrical outside diameter. In FIG. 4, meridionally divided volute 223 defines volute passageways 226 and 227 both of which direct gas substantially radially into the turbine wheel 230 through turbine inlet opening portions 224a and 224b, respectively. The closure means is a cylinder 251 moveable between a first solid line position to allow gases from both passageways to enter the turbine wheel at high engine speeds, and a second, dotted line position wherein inlet opening portion 224a is closed to permit gas flow into turbine wheel 230 only from passageway 227 at low engine speeds. The embodiment of FIG. 4 can also be incorporated into a system like that shown in FIG. 2 to direct all of the engine exhaust gas through volute passageway 227 at low engine speeds.

While presently preferred embodiments have been described above, the invention can take numerous other forms. Accordingly, the present invention is to be limited only as required by the scope of the following claims.

I claim:

1. A variable geometry turbine system for as internal combustion engine turbocharger comprising:
   a turbine wheel having a central core and a plurality of outwardly extending vanes, said turbine wheel being rotatable about a central axis;
   a meridionally divided volute for exhaust gas surrounding said turbine wheel, said meridionally divided volute including means for defining first and second volute passageways having a divider wall therebetween, said first and second volute passageways defining first and second turbine inlet openings permitting exhaust gas from said first and second volute passageways, respectively, to act on the outwardly extending vanes of said turbine wheel, said first volute passageway directing exhaust gas into said turbine wheel substantially radially of said wheel and said second volute passageway directing exhaust gas into said turbine wheel substantially axially of said wheel; and
   closure means movable between a first position in which said first and second turbine inlet openings are open permitting exhaust gas from both said first and second volute passageways to act on the outwardly extending vanes of said turbine wheel during periods of high engine speed, and a second position in which said first turbine inlet opening is closed permitting exhaust gas from only said second volute passageway to act on the outwardly extending vanes of said turbine wheel during periods of low engine speed,
   said turbine comprising a mixed-flow turbine when said closure means is in said first position, and an axial flow turbine when said closure means is in said second position.

2. The turbine system of claim 1 wherein said closure means includes a valve means for blocking the entrance of the first volute and for diverting all engine exhaust gas flow into said second volute passageway when said closure means is in said second position.

3. The turbine system of claim 2 wherein said valve means comprises a valve positioned between the internal combustion engine and the meridionally divided volute, said valve being movable between a first valve position permitting exhaust gas flow from said engine into both said first and second volute passageways, and a second valve position blocking said first volute passageway and diverting all of the exhaust gas flow into said second volute passageway.

4. The turbine system of claim 3 including control means for operating said closure means by sensing engine operation and moving said closure means and said valve between said first closure means and valve positions at high engine speeds and said second closure means and valve positions at low engine speeds.

5. The turbine system of claim 1 wherein said turbine system includes a turbine housing and said closure means comprises a cylindrical-shaped member slidably mounted to said turbine housing, and wherein said system further includes means for sliding said cylindrical-shaped member laterally between said first and second positions.

6. The turbine system of claim 5 wherein said turbine vanes have tips configured to define a turbine wheel having a conical-shaped outside diameter and wherein the inner surface of said cylindrical-shaped member is also of conical shape, to provide a larger than normal running clearance between the outside diameter of the turbine wheel and the inner surface of said cylindrical member when the cylindrical member is in said first position.

7. The turbine system of claim 1 including control means for operating said closure means by sensing one or more engine operating conditions.

8. A variable geometry turbine system for internal combustion engine turbochargers comprising:
   a turbine wheel having a central core and a plurality of outwardly extending vanes, said turbine wheel being rotatable about a central axis;
   a meridionally divided volute for exhaust gas surrounding said turbine wheel, said meridionally divided volute including means for defining first and second volute passageways having a divider wall therebetween, said first and second volute passageways defining first and second turbine inlet openings permitting exhaust gas from said first and second volute passageways to act on the outwardly extending vanes of said turbine wheel;
   a closure member movable between a first open position in which said first and second turbine inlet openings are open, permitting exhaust gas from both said first and second volute passageways to act on the outwardly extending vanes of said turbine wheel during periods of high engine speed, and a second position in which said first turbine inlet opening is closed permitting exhaust gas from only said second volute passageway to act on the outwardly extending vanes of said turbine wheel during periods of low engine speed;
   valve means movable between a first valve position permitting exhaust gas flow from said engine into both said first and second volute passageways, and a second valve position blocking said first volute passageway and diverting all of the exhaust gas flow from said engine into said second volute passageway; and
   control means coupled to said closure member and said valve means for moving said closure member and said valve means from their first positions to their second positions, and from their second positions to their first positions.

9. The turbine of claim 8 wherein said first and second volute passageways direct exhaust gas into said turbine wheel substantially radially of said wheel.

10. The turbine of claim 9 wherein said turbine vanes have tips configured to define a turbine wheel of substantially cylindrical outside diameter.

11. The turbine system of claim 8 wherein said first volute passageway directs exhaust gas into said turbine wheel substantially radially of said turbine wheel and said second volute passageway directs exhaust gas into said turbine wheel substantially axially of said turbine wheel, said turbine comprising a mixed-flow turbine when said closure means and said valve means are in their first positions, and essentially an axial flow turbine when said closure means and said valve means are in their second positions.

12. The turbine system of claim 8 wherein said closure member comprises a cylindrical member mounted to the turbine casing of said turbine system for lateral movement between said first and second positions.

13. The turbine system of claim 12 wherein said turbine vanes have tips configured to define a turbine wheel having a conical-shaped outside diameter and wherein the inner surface of said cylindrical member is also of conical shape, to provide a larger than normal running clearance between the outside diameter of the turbine wheel and the inner surface of said cylindrical member when the cylindrical member is in said first position.

14. The turbine system of claim 8 wherein said valve means comprises a valve positioned between the internal combustion engine and the meridionally divided volute.

* * * * *

UNITED STATES PATENT AND TRADEMARK OFFICE
CERTIFICATE OF CORRECTION

PATENT NO.  : 4,776,168

DATED       : OCTOBER 11, 1988

INVENTOR(S) : WILLIAM E. WOOLLENWEBER

It is certified that error appears in the above-identified patent and that said Letters Patent is hereby corrected as shown below:

In the Abstract on page 1, on line 8, after "both", insert --turbine inlet openings are open to permit exhaust gas--; line 9 after "turbine" [first occurrence], delete "turbine inlet; line 10, delete "openings are open to permit exhaust gas"; line 17, after "diverting", delete "during per-"; line 18, delete "ods of reduced engine speed. The turbine"; line 19, after "passageway", insert --during periods of reduced engine speed. The turbine--;

In col. 1, line 29, delete "opeaating" and insert --operating-- therefor;

In col. 6, line 38, delete "1" and insert --efficiency-- therefor;

In col. 8, line 46, delete "13" and insert --131a-- therefor;

Signed and Sealed this

Twenty-seventh Day of June, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,776,168

DATED : October 11, 1988

INVENTOR(S) : WILLIAM E. WOLLENWEBER

It is certified that error appears in the above-identified patent and that said Letters Patent is hereby corrected as shown below:

In the Abstract on page 1, on line 8, after "both", insert --turbine inlet openings are open to permit exhaust gas--; line 9 after "turbine" [first occurrence], delete "turbine inlet; line 10, delete "openings are open to permit exhaust gas"; line 17, after "diverting", delete "during peri-"; line 18, delete "ods of reduced engine speed. The turbine"; line 19, after "passageway", insert --during periods of reduced engine speed. The turbine--;

In col. 1, line 29, delete "opeaating" and insert --operating-- therefor;

In col. 6, line 38, delete "1" and insert --efficiency-- therefor; line 59, after "turbine" insert --,-- (a comma);

In col. 8, line 46, delete "13" and insert --131a-- therefor;

This certificate supersedes Certificate of Correction issued June 27, 1989.

Signed and Sealed this

Eighteenth Day of July, 1989

Attest:

DONALD J. QUIGG

Attesting Officer

Commissioner of Patents and Trademarks